(12) United States Patent
Frank et al.

(10) Patent No.: US 8,112,798 B2
(45) Date of Patent: Feb. 7, 2012

(54) HARDWARE-AIDED SOFTWARE CODE MEASUREMENT

(75) Inventors: Alexander Frank, Bellevue, WA (US); Curt A. Steeb, Redmond, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 11/418,710

(22) Filed: May 5, 2006

(65) Prior Publication Data

US 2007/0107056 A1   May 10, 2007

Related U.S. Application Data (60) Provisional application No. 60/735,528, filed on Nov. 9, 2005.

(51) Int. Cl.
*G06F 12/14* (2006.01)
(52) U.S. Cl. ............ 726/22; 726/27; 713/189; 713/190; 713/164; 711/141; 711/146; 707/781; 705/52
(58) Field of Classification Search .................. None
See application file for complete search history.

(56) References Cited

U.S. PATENT DOCUMENTS

| | | | |
|---|---|---|---|
| 5,481,463 A | 1/1996 | Constant | |
| 5,634,058 A | 5/1997 | Allen | |
| 5,826,090 A | 10/1998 | Mealey | |
| 6,243,692 B1 | 6/2001 | Floyd | |
| 6,272,636 B1 | 8/2001 | Neville | |
| 6,327,652 B1 | 12/2001 | England | |
| 6,363,436 B1 | 3/2002 | Hagy | |
| 6,499,110 B1 * | 12/2002 | Moses et al. .................... 726/1 |
| 6,810,438 B1 | 10/2004 | Chrysanthakopoulos | |
| 6,985,946 B1 | 1/2006 | Vasandani | |
| 7,069,330 B1 | 6/2006 | McArdle | |
| 7,146,496 B2 | 12/2006 | Circenis | |
| 7,171,686 B1 | 1/2007 | Jansen | |
| 7,228,545 B2 | 6/2007 | Circenis | |
| 7,302,585 B1 * | 11/2007 | Proudler et al. .............. 713/189 |

(Continued)

FOREIGN PATENT DOCUMENTS

EP    1357454    10/2003

(Continued)

OTHER PUBLICATIONS

Stavrou et al., "A Pay-per-Use DoX Protection Mechanism for the Web", Columbia University, 2004, pp. 1-15.

(Continued)

*Primary Examiner* — Nasser Moazzami
*Assistant Examiner* — Fikremariam A Yalew
(74) *Attorney, Agent, or Firm* — Workman Nydegger (57) ABSTRACT

Described is an independent computation environment that is built into one or more hardware components of a computer system, wherein the independent computation environment hosts a logic that measures the health of other software code that executes in memory. Examples of ways to measure health include performing a mathematical computation such as a computing a hash/digital signature on the software code in the memory, and/or evaluating statistical information related to the execution of the code and/or the code's being loaded into memory. By executing the logic in an independent computation environment, the health of software code may be measured against policy/metadata in a tamper-proof or tamper-resistant environment. When the software code measurement does not comply with the policy, some action may be taken action to penalize the computer system.

23 Claims, 4 Drawing Sheets

U.S. PATENT DOCUMENTS

| | | | |
|---|---|---|---|
| 7,334,124 B2 * | 2/2008 | Pham et al. | 713/162 |
| 7,373,497 B2 | 5/2008 | Circenis | |
| 7,392,541 B2 | 6/2008 | Largman | |
| 7,401,358 B1 * | 7/2008 | Christie et al. | 726/21 |
| 7,500,093 B2 | 3/2009 | Makita | |
| 7,571,087 B1 * | 8/2009 | Wheeler | 703/14 |
| 7,571,143 B2 | 8/2009 | Circenis | |
| 7,603,707 B2 * | 10/2009 | Seifert et al. | 726/22 |
| 2001/0034762 A1 | 10/2001 | Jacobs | |
| 2002/0042882 A1 | 4/2002 | Dervan | |
| 2002/0120871 A1 * | 8/2002 | Watkins et al. | 713/201 |
| 2002/0147633 A1 | 10/2002 | Rafizadeh | |
| 2005/0055588 A1 | 3/2005 | Nalawadi | |
| 2005/0144608 A1 | 6/2005 | Oyama | |
| 2005/0160035 A1 | 7/2005 | Umamyo | |
| 2005/0160281 A1 | 7/2005 | Thibadeau | |
| 2005/0166208 A1 | 7/2005 | Worley | |
| 2005/0172017 A1 | 8/2005 | Dawson | |
| 2005/0223243 A1 | 10/2005 | Moore | |
| 2005/0240985 A1 | 10/2005 | Alkove | |
| 2005/0268058 A1 | 12/2005 | Drasnin | |
| 2005/0283751 A1 * | 12/2005 | Bassin et al. | 717/100 |
| 2006/0080648 A1 | 4/2006 | Anwar | |
| 2006/0128305 A1 | 6/2006 | Delalat | |
| 2006/0130048 A1 * | 6/2006 | Ho et al. | 717/170 |
| 2006/0174229 A1 | 8/2006 | Muser | |
| 2006/0174352 A1 * | 8/2006 | Thibadeau | 726/27 |
| 2006/0184771 A1 * | 8/2006 | Floyd et al. | 712/218 |
| 2006/0190602 A1 * | 8/2006 | Canali et al. | 709/226 |
| 2006/0224689 A1 | 10/2006 | Leip | |
| 2007/0106682 A1 | 5/2007 | Frank | |
| 2007/0143159 A1 | 6/2007 | Dillard | |
| 2007/0180450 A1 | 8/2007 | Croft | |
| 2007/0240160 A1 | 10/2007 | Paterson-Jones | |
| 2007/0293169 A1 | 12/2007 | Maggio | |
| 2008/0312948 A1 | 12/2008 | Kalliola | |
| 2008/0319841 A1 | 12/2008 | Oliver | |

FOREIGN PATENT DOCUMENTS

| | | |
|---|---|---|
| WO | 01/77156 | 9/2001 |
| WO | 2004/006059 | 1/2004 |

OTHER PUBLICATIONS

Zhang et al., "Achieving Deterministic, Hard Real-time Control on an IBM—Compatible PC: A General Configuration Guideline", Department of Mechanical Engineering, University of New Mexico, 2005, pp. 1-7.

Henderson "Linux Loadable Kernel Module HOWTO", retrieved at <<http://www.ibiblio.org/pub/Linux/docs/HOWTO/other-formats/pdf/Module-HOWTO.pdf>>, Lauri Tishler, 1996, pp. 90.

Lerhaupt et al., "Dynamic Kernel Module Support", retrieved at <<http://linux.dell.com.dkms/lq04-ler.pdf>, Power Solutions, Mar. 2004, pp. 94-98.

"Managing and Developing Dynamically Loadable Kernel Modules", retrieved at <<http://docs.hp.com/en/dlkm-62001/dlkm-62001.pd>>, Hewlett-Packard, Jun. 7, 2001, pp. 489-572.

Office Action dated Apr. 17, 2008 cited in U.S. Appl. No. 11/424,487.
Office Action dated Oct. 20, 2008 cited in U.S. Appl. No. 11/424,487.
Office Action dated Jan. 13, 2009 cited in U.S. Appl. No. 11/424,487.
Office Action dated Jul. 23, 2009 cited in U.S. Appl. No. 11/424,487.
Office Action dated Sep. 4, 2009 cited in U.S. Appl. No. 11/424,487.

* cited by examiner

HARDWARE-AIDED SOFTWARE CODE MEASUREMENT

CROSS REFERENCE TO RELATED APPLICATION

The present invention claims priority to U.S. provisional patent application Ser. No. 60/735,528, filed Nov. 9, 2005, which is hereby incorporated by reference.

BACKGROUND

In personal computers and many similar computing devices, today's operating systems may be considered "open" in that administrators are able to change and/or patch the operating system code, install devices drivers, services, update components and so forth. As a result, code within the operating system itself is not a good mechanism for attesting that a specific binary module or set of modules is properly executing (sometimes referred to as "healthy"), and, for example, has not been intentionally or inadvertently tampered with (sometimes referred to as "unhealthy"). Although there are a number of reasons for such a deficiency in verification, as long as the administrator or programs running on the administrator's behalf may change the operating system, in general the operating system is inapt to determine the integrity and/or authenticity of components.

Trust platforms and the like (e.g., a Trusted Platform Module model) are aimed at verifying the integrity of the boot sequence, but have no role afterwards. Due to the complexity of contemporary operating systems, it is also uncertain as to whether a trusted platform model can credibly attest about the operating system's integrity after boot (or even during boot). For example, following boot, a piece of code in the operating system can be modified such that it does not verify a particular binary, or verifies that the binary is healthy even when it is not, and/or simply does not do anything upon detection of an unhealthy module.

Various business models and applications are likely to benefit from a system that can reliably measure and attest the integrity and authenticity of binary modules. For example, software that computes a compensation charge based on how often it runs needs to ensure that the code does not get hacked in a manner that would result in an incorrect amount due, or in no payment ever being due.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards an independent computation environment that is contained at least in part in a set of one or more hardware components. The independent computation environment hosts logic that measures the health of at least one set of software code that is in memory, to cause an action if the set of software code is measured to be unhealthy according to policy data.

By executing the logic in an independent computation environment, the health of software code may be measured against policy in a tamper-proof or tamper-resistant environment. When the set of software code complies, the measurement is again taken, such as periodically as defined by the policy, or when watched memory changes. When the set of software code does not comply, some action may be taken that results in penalizing the computer system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
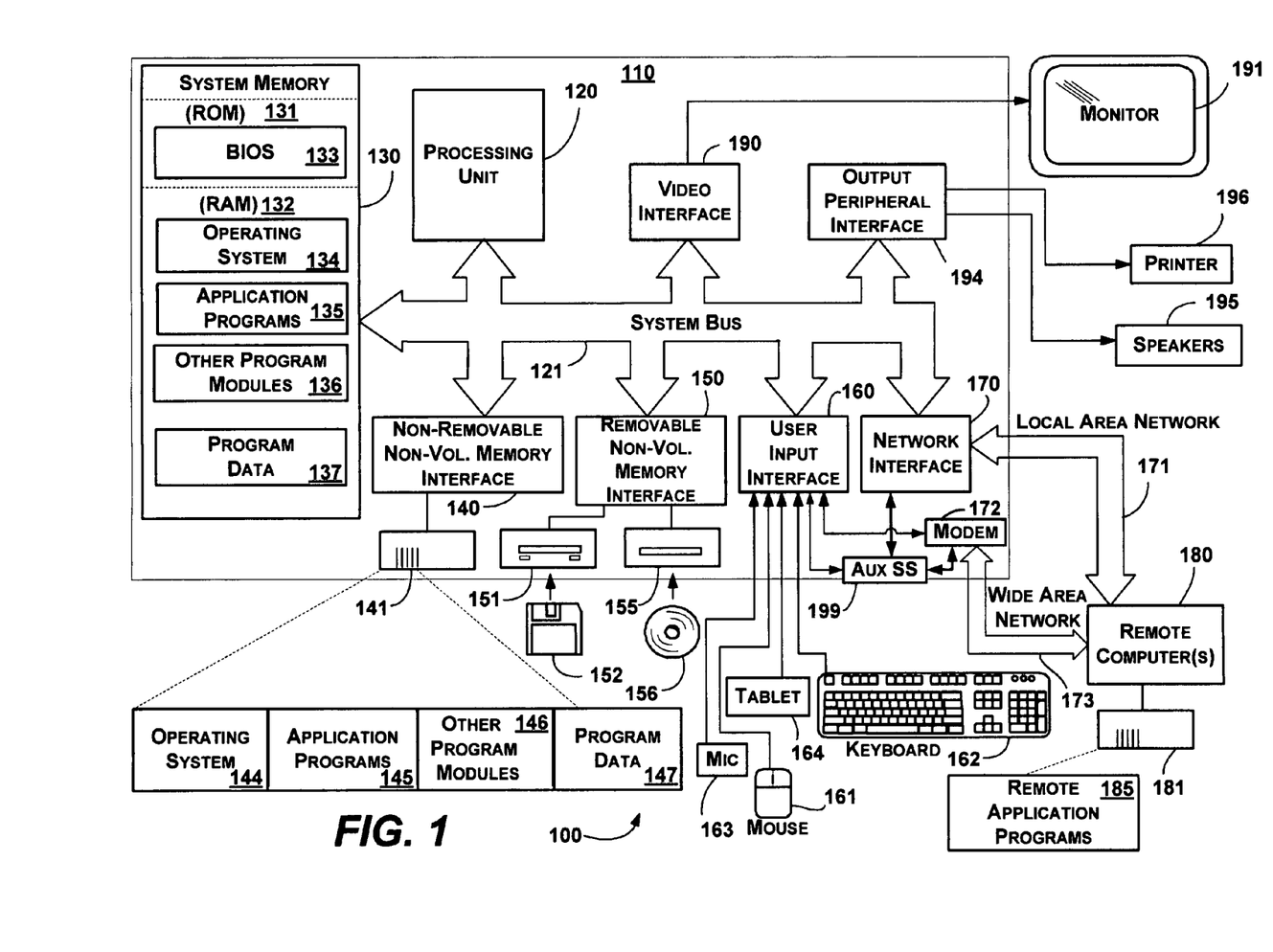
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Hardware Aided Software Code Measurement for Verification

Various aspects of the technology described herein are directed towards a technology by which any given piece of software code may be measured for verification (e.g., of its integrity and authenticity) in a regular, ongoing manner that effectively takes place in real-time. As used herein, the term "measure" and its variants (e.g., "measured," "measuring," "measurement" and so forth) with respect to software code generally refers to any abstraction for integrity and/or authentication checks, in which there are several ways to validate integrity and/or authentication processes. Some example ways to measure are described below, however this measurement abstraction is not limited to those examples, and includes future any techniques and/or mechanisms for evaluating software code and/or its execution.

As will be understood, multiple sets of code may be measured, and some penalty applied in the event that any set of code is not verified as healthy. For example, as a penalty, the computer system (such as one based on the computer 110 of FIG. 1) running unhealthy code may be shut down, may reduce its performance in some way (at least in part) that makes normal usage impractical, may require that the administrator contact a software vendor or manufacturer for a fix/permission, or the unhealthy code may be stalled, (e.g., by trapping) and so forth.

In general and as described above, easily replaceable or modifiable software, as is the situation with an open operating system, is not an acceptable mechanism for measuring the health of other software code. Instead, as described below, there is herein described a technology comprising a hardware-aided mechanism/solution (e.g., CPU-based) that provides for an external root of trust that is independent of the operating system. As also described below, to measure the integrity of sets of code such as binary modules, the hardware mechanism may take actions to compensate for the lack of a real-time method, and also may provide data about the execution of each subject binary module to help reach a conclusion about its health.

In one example implementation, the hardware mechanism comprises an independent (sometimes alternatively referred to as isolated) computation environment (or ICE), comprising any code, microcode, logic, device, part of another device, a virtual device, an ICE modeled as a device, integrated circuitry, hybrid of circuitry and software, a smartcard, any combination of the above, any means (independent of structure) that performs the functionality of an ICE described herein, and so forth, that is protected (e.g., in hardware) from tampering by other parties, including tampering via the operating system and bus masters. An independent computation environment enables independent computation environment-hosted logic (e.g., hardwired logic, flashed code, hosted program code, microcode and/or essentially any computer-readable instructions) to interact with the operating system, e.g. to have the operating system suggest where the subject modules supposedly reside. Multiple independent computation environments are feasible, but one independent computation environment that monitors multiple memory regions for possibly many different characteristics may suffice.

Figure 2:
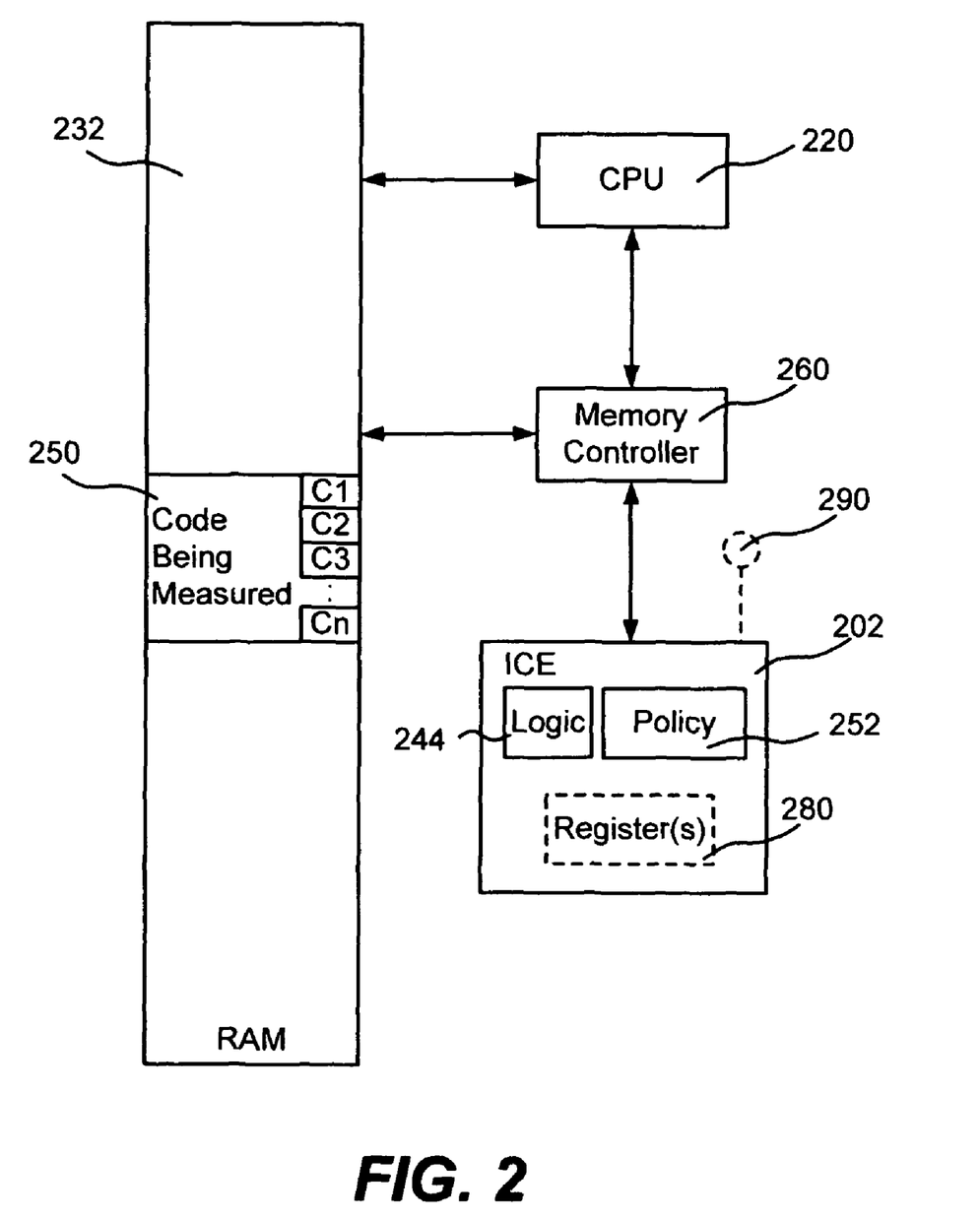
FIG. 2 is a representation of an architecture including an independent computation environment that measures the health of one or more sets of subject code running in memory.
Figure 3:
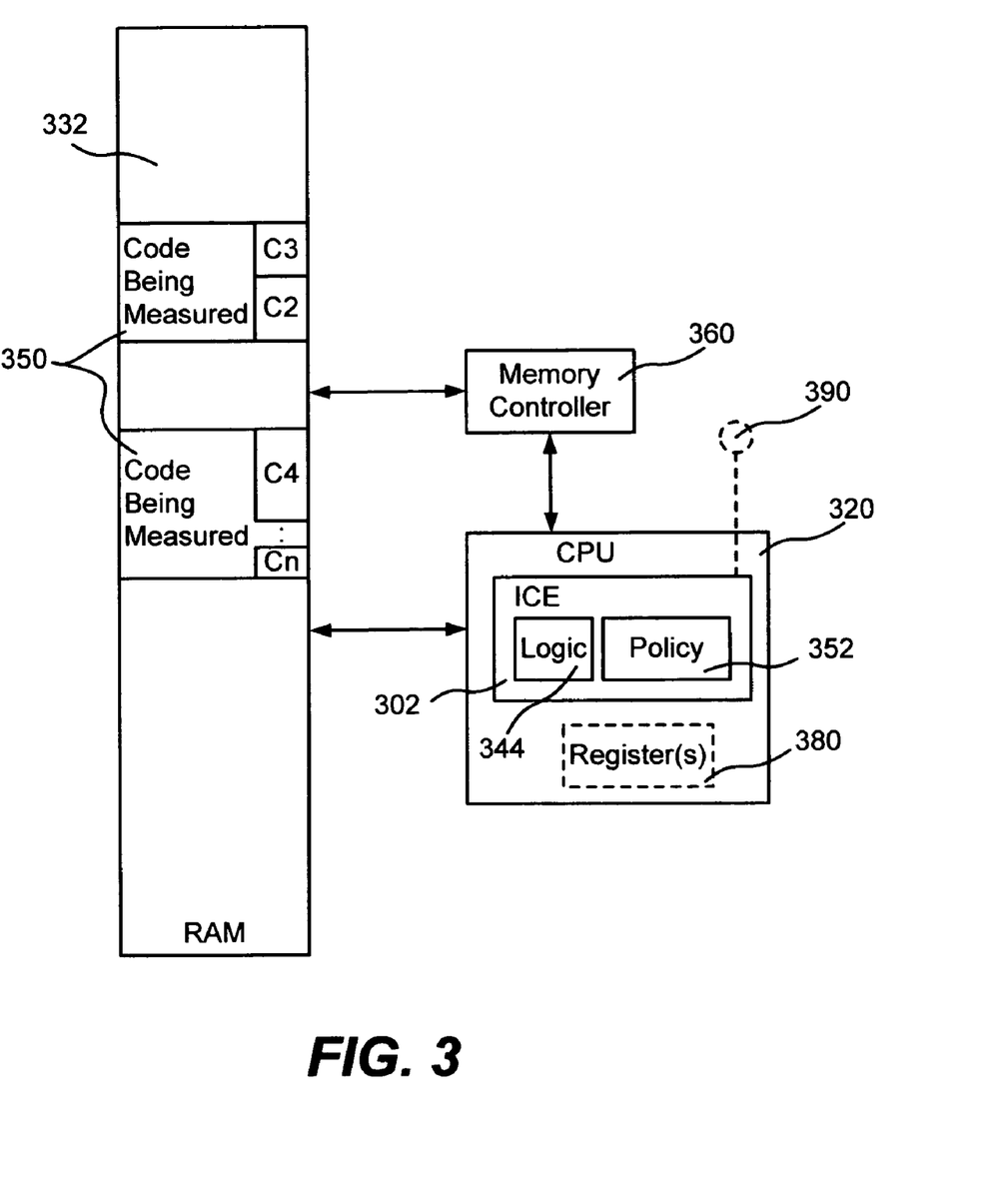
FIG. 3 is a representation of an architecture including an independent computation environment incorporated in a central processing unit (CPU) that measures the health of one or more sets of subject code running in memory.

FIGS. 2 and 3 represent examples of an independent (or isolated) computation environment 202 or 302 measuring the health of one or more sets of code 250 or 350 (code modules or the like, with C1-Cn represented as an example) running in one or more memory regions in physical memory (RAM) 232. The one or more sets of code C1-Cn need not be contiguous in the physical memory, as represented in the non-contiguous sets 350 in the memory 332 represented in FIG. 3. Note that while it would be straightforward to measure code in virtual memory, doing so could possibly defeat the independent computation environment, such as by having the operating system's virtual memory-related code manipulate virtual-to-physical mapping. This potential threat may be mitigated by having virtual-to-physical mapping controlled by a trustworthy component, and/or by having the independent computation environment described herein measure the contents and behavior of instructions in the physical memory space.

In the implementation represented in FIG. 2, the independent computation environment 202 is an independent entity (that is, not part of another hardware component such as the CPU 240). In the alternative implementation represented in FIG. 3, an independent computation environment 302 is shown as being incorporated into the CPU 320, e.g., as part of its circuitry or as independent circuitry in the same physical package. Yet another implementation may rely on software only, with lesser resilience.

The independent computation environments 202 or 302 each include (or are otherwise associated with) hosted logic 244 or 344, and an installed policy, 252 or 352 respectively, any or all of which may be hard wired at least in part and/or injected later for change (e.g., by being flashed, possibly with an expiration time). Part or all of the policy may be within the hosted logic and/or separate from it, e.g., coded into rules. The logic and/or policies may be signed, or otherwise known to be valid (e.g., via hard wiring), and may be required to be present on a certain computer or class of computer. Further, different logic and/or policies may apply to different classes of computers. As but one example, the logic 344 and/or its related policy 352 (FIG. 3) of the independent computation environment 302 incorporated into the CPU 320 may be different from the logic 244 and/or its related policy 252 of the independent computation environment 202 of FIG. 2.

Although all possible implementations are not shown, it is understood that an independent computation environment may be independent as in FIG. 2, or incorporated into essentially any suitable hardware component, (possibly but not necessarily the CPU 320 as in FIG. 3), as long as the independent computation environment is difficult to tamper with. Thus, other alternative implementations are feasible. For example, the independent computation environment may be implemented in other hardware, such as in a memory controller, or may be part of special RAM chips, e.g., built into the motherboard. Moreover, while the hosted logic 244 or 344 and/or policy 252 or 352 may be considered part of the independent computation environment 202 or 302, there is no physical requirement that it be part of the same hardware component or components, and indeed the independent computation environment may be made up of various, physically distinct hardware components.

For purposes of simplicity herein, the following description will use the reference numerals of FIG. 3 unless otherwise noted. As can be readily appreciated, the physical location of the independent computation environment can vary between embodiments, and thus the embodiment of FIG. 3 is equivalent to essentially any other embodiment, including that of FIG. 2, when describing many of the characteristics of an independent computation environment.

Regardless of any physical implementation/embodiment, independent computation environments may have a number of characteristics that are similar to one another. For example, an independent computation environment 302 provides the logic with reliable access to the RAM 332, where the subject set or sets of code 350 being measured (e.g., the module or modules being monitored/validated/authenticated) reside. To access the memory 332, the independent computation environment hosted logic does not depend on an operating system side agent for access, because the operating system could be compromised. The measured code 350 may reside anywhere in RAM 332, as long as the independent computation environment 302 has a way of knowing where it is. For example, the independent computation environment 302 may use offsets, and/or may have an instruction pointer to a window (or pointers to windows) in the memory 332. Another, somewhat simpler option is to require that the set of code to be measured always resides in the same physical address space.

The memory section or sections 350 that contain the measured code sets (e.g., C1-Cn) may be watched by some mechanism, referred to as a memory watch component, or memory watchdog. In general, a memory watchdog fires exceptions/events upon attempts to modify at least one designated location in memory; (note that at least one "location" includes as little as a single location, or any contiguous or non-contiguous range, memory block or set of blocks). This relates to any memory modification, including CPU-originated and peripheral-originated RAM write requests. The memory controller 360 may be configured to provide such events, and thus should also be based on hardware that cannot be easily compromised, however it is understood that a memory watch component/watchdog may comprise software or hardware, or a combination of software and hardware.

Various techniques for handling memory watchdog exceptions may be used. For example, in one implementation, the CPU may be halted during such exceptions until clearance by the hosted logic 344 and/or policy 352 of the independent computation environment 302. Alternatively, the independent computation environment 302 may instead otherwise penalize the system state (e.g., block the problematic code, reduce the system, reset the system or otherwise activate some enforcement mechanism) upon an attempt to alter modify the RAM in the region of the subject code 350. Another alternative is to have the independent computation environment block write access to the subject code 350.

With respect to the measurements of the subject code 350, the independent computation environment-hosted logic 344 may use virtually any techniques. For instance, hashes/digital signatures/certificates and/or other mathematically computations may be used to authenticate that a correct set of binary code is present where it should be, such as based on well-known digital signature technology (e.g., according to Cert X.509 and/or RSA standards) that can be compared to one or more corresponding values in the policy. Alternatively, if the measured code is relatively small, the hosted logic 344 may simply evaluate its instructions, or some subset thereof, against values in the policy that match the instructions. Still another option is statistical or similar analysis of the code, e.g., such as a pattern in which it executes, as described below. Any combination of measuring techniques may be employed.

It should be noted that the computations that may be taken to evaluate the memory may take a significant amount of time to perform. Indeed, the watched range may change while the range of memory is being read, e.g., linearly. Thus, depending on policy, the watchdog may trigger a re-read upon any change during the reading operation so that the memory that was already read cannot be changed behind the location currently being read. The policy may specify that this is allowable, or may specify trying again, and if so, how often (e.g., up to some limit), and so forth.

Thus, the hosted logic 344 may obtain data about the health of the subject code 350 in various ways. One way to obtain health data is for the independent computation environment to set soft-ICE-trap instructions in points of interest in the code 350. Alternatively, or in addition to the trap technique, the hardware (e.g., the CPU 320) may allow the independent computation environment 302 to ask for statistics about execution of the subject code 350. This may be accomplished by defining registers (280 or 380) or the like that trigger the counting of execution of certain binary instructions or ranges of instructions. Note that if present, these registers 280 or 380 may be in the hardware to avoid tampering, such as exemplified as being part of the independent computation environment 202 (FIG. 2) or in the CPU 320 (FIG. 3).

Note that the measured code of interest may have accompanying metadata (which may be schematized and/or stored as part of the policy 352) that describes what sort of statistics are to be gathered, and a description of how a healthy module should look. The metadata may be provided by the module author and/or the computer provider. For example, metadata may specify that the independent computation environment 302 should be getting CPU control ten-to-fifteen times per second, that the instruction at some address (e.g., A1) in the subject code 350 should be executed ten times for each time the instruction at some other address (e.g., A2) is executed, and so forth.

Further examples of metadata that may be associated with a set of subject code to describe its health characteristics to the independent computation environment 302 (that is essentially standing guard to validate compliance) include digital signature(s) for integrity and/or authentication checks, and/or expected number of times the module gets to execute per period (e.g., second, minute, or other). This number of execution times may be a range, and may be as general as the entire set of code, and/or more specific to the granularity of instruction ranges or specific instructions. Instead of or in addition to execution statistics, a statistical evaluation of how often the code resides in memory may be evaluated, e.g., a module may have to be loaded into memory some threshold amount (or percentage) of time, and/or only may be not in the memory for a specified amount of time, (or number of times per second, minute and so forth).

Still another example of metadata and statistics includes the expected values of certain registers and/or memory addresses at certain instructions. This may be pronounced as a distribution, e.g., as various values or ranges of values with a probability weight. Another type of metadata and statistics may specify a relationship between the expected values of several registers and memory addresses; for example, if one variable is less than ten (Var1<10), another variable has to match certain criteria, (e.g., 50 percent of the time variable Var2 is greater than, 25 percent of the time is greater than 100, and sometimes may be 399; Var2 should never be less than zero).

Other examples of metadata and statistics include those based on instructions. Instructions may be counted for the number of times they execute relative to other instructions, optionally with statistics/ratios used for evaluating good counts versus bad counts, so that a small number of occasional differences may be tolerated. When something looks suspicious but is not necessarily a definite violation, the policy may change to run a different algorithm, change variables, watch more closely or more frequently, and so forth.

Using the metadata and/or other techniques, the independent computation environment 302, via the hosted logic 344 and policy 352, may measure and validate the integrity and authenticity of any specified set of code (e.g., C4). For example, the independent computation environment 302 may be programmed to look for a certain set of one or more modules, or expect a policy that specifies which module or modules are to be validated.

During normal operation, the hosted logic 344 may be activated by an operating system request. Note that while this is something that could be easily tampered with, doing so when an ICE is present would not make sense, because the computer system would be penalized by the ICE if the operating system failed to initiate a required validation measurement. For example, the independent computation environment may (via an internal timer) gives the operating system a grace period to initiate the validation measurement, and if this time elapses, the independent computation environment may deem the system corrupt (unhealthy) and take some penalizing action.

Note that with respect to measurement time, as described above, one option is to require that a set of subject code to be measured (e.g., C3) always resides in the same physical address space. In such a situation, the independent computation environment 302 may attempt verification speculatively, including at random or pseudo-random times.

Before starting the measurement process, the hosted logic 344 may "lock" some or all of the subject code, also referred to as target modules. One implementation uses the above-described memory-altering watchdog to ensure that the subject code is not changed in the watched region or regions. Another measuring technique may lock the memory for write accesses, although this requires unlocking if and when the operating system attempts to repurpose the RAM, e.g., for virtual memory and paging, which may be allowed in a given measured code situation.

To this end, the hosted logic 344 may provide the operating system some interface (which may be explicit or possibly implicit) to repurpose the RAM 332. An explicit interface would allow the operating system to notify the independent computation environment about its intent to repurpose the RAM; in general, this may be viewed as the operating system asking the independent computation environment 302 for permission to repurpose the RAM 332. One or more optional APIs (represented by the dashed interface 290 in FIGS. 2 and 390 in FIG. 3) may be provided to facilitate operation, such as Ice.AskPermissionToRepurposeMemory( ), Ice.SetValidationPolicy( ), Ice.SuggestModuleAddress( ), Ice.UpdateModuleMetaInfo( ), and/or others.

An implicit interface can be based on the memory-watchdog-exception, which is interpreted by the independent computation environment as a request to permit RAM repurposing. Along these lines, there are times when the independent computation environment 302 does not care how the memory is repurposed, e.g., at times when the code is not being measured. For example, metadata may indicate that a set of code is to be measured ten times per second, and during non-measuring times the operating system can use the memory any way it wants.

Upon a RAM repurposing request, the independent computation environment 302 may implicitly or explicitly grant the request. In any case, the independent computation environment 302 still stands guard to ensure the health of the code being measured, as subject to the metadata associated with that measured code.

By way of example, given an independent computation environment (e.g., hierarchical, system-based or a similar "root of trust"), various features are desirable to enable modular-authentication.

In general, the independent computation environment 302 provides reliable read access to the computer memory 332. The hosted code 344 assumes that the read operations are neither virtualized, nor they are re-mapped to other memory or I/O space, nor filtered or modified in any other manner; (at present, contemporary BIOS can leverage a subset of this when the hardware follows best practices about the chipset). The independent computation environment 302 also may enable the hosted code 344 to set watchdogs on certain memory areas that will trigger one or more signals upon each modification of the contents of these memory areas. The watchdog provides alerts about any memory contents change in the physical memory space, including changes originated by direct memory accesses (DMAs) and bus master. Note that an existing x86-based computer system may incorporate an ICE into its BIOS by having the BIOS host a limited policy engine, e.g., one that can measure subject code as long as the subject code remains fixed in a particular memory range.

The independent computation environment 302 may further enable the hosted code 344 to obtain statistics about the instruction pointer's appearance in certain memory ranges. For instance, an instruction pointer-watchdog may be used to alert the independent computation environment 302 every time the instruction pointer gets into and out of specified memory range(s) of interest. Other models are viable, including the register-based model described above.

As also described above, the independent computation environment 302 also may be configured to observe/attest as to the sort of activity of the code being measured. For example, the author can describe (e.g., in metadata) a module's characteristic behavior in virtually any way, as long as the independent computation environment can measure and evaluate the behavior. As long as that module behaves within the specified behavior (e.g., performance) envelope, that module is considered healthy.

By way of example, a relatively straightforward characteristic to profile and follow is input/output (I/O) operation. To this end, the authenticated modules may be fastened in such a way that if stolen (e.g., placed into the image of another operating system), the modules will have to be kept healthy to pass the modular authentication successfully. As a result, if these modules are placed into the code of another operating system, they will have to get control and direct access without virtualization (except in the hardware device itself).

As described above, the independent computation environment 302 may continuously monitor the code being measured 350, but depending on the policy 352, may instead only monitor the code 350 at times the policy 352 deems appropriate. As a result, code that need not be monitored continuously may be swapped into memory, such as according to policy, with measurement or statistical gathering only taking place on the code during the time that it is swapped into memory.

Figure 4:
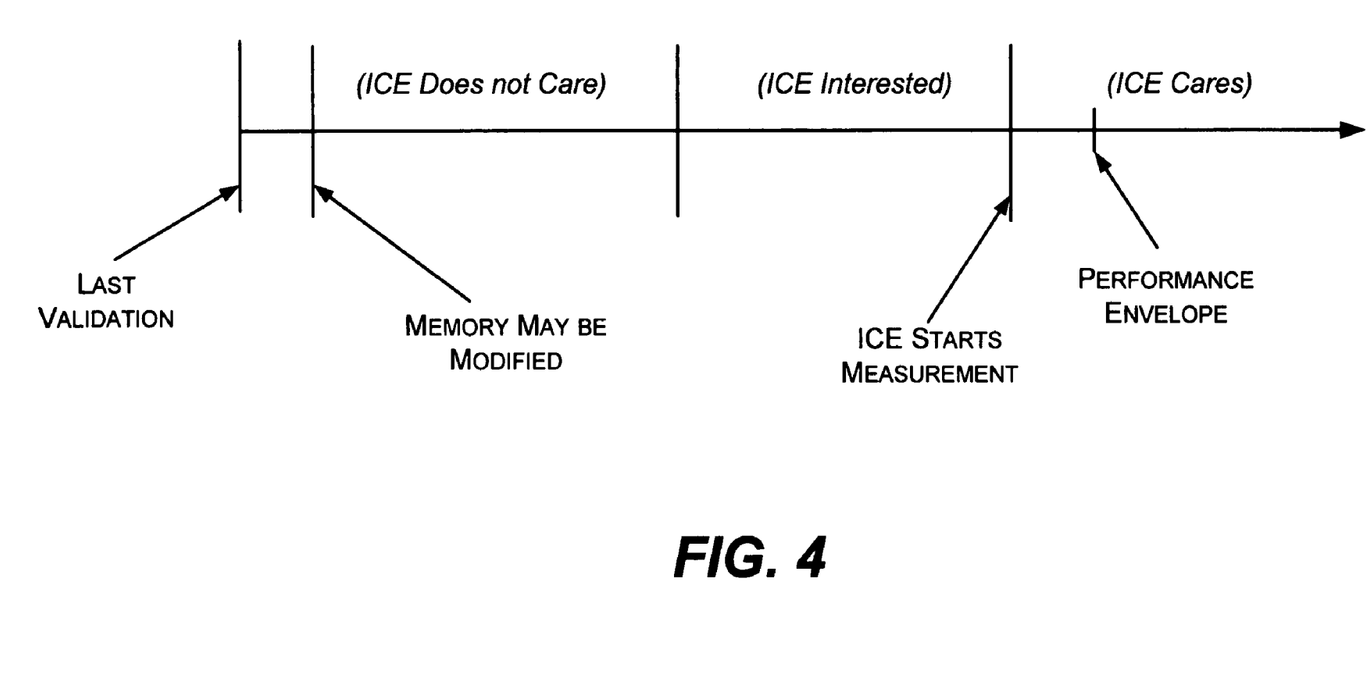
FIG. 4 is an example timing diagram representing various time windows that may exist with respect to measuring the health of subject code.

FIG. 4 shows an example timing diagram in which the independent computation environment 302 only measures occasionally (e.g., periodically or on some event, or even randomly) about what code is present and/or how it is operating. Note that FIG. 4 is a timing diagram for what is in the memory; with a statistical-based analysis, e.g., how many times certain instructions of the code are executed relative to other instructions, or with a frequency-based analysis, e.g., how many times certain instructions of the code are executed per time period, the "ICE does not care" region can essentially span the entire time, as long as the counts (e.g., in the registers) are correct whenever they are measured, which may be fixed or sporadic.

The policy 352 will typically decide on when and what kind of measuring is needed. For example, the timing diagram exemplified in FIG. 4 does not require that the code being measured remain in memory at all times. Thus, there is an "ICE does not care" time frame that follows (except for the first time) a previous measurement complete state, referred to in FIG. 4 as "Last Validation." In this time frame, the operating system can swap in new code or otherwise leave whatever it wants in the corresponding measured region or regions, because they are not being measured at that time. If locked, the memory region may be unlocked at this time.

In the "ICE interested" time, the independent computation environment 302 may start its measurement, such as to reset counters and the like, although if not correct in this time frame, no enforcement may be done. This time frame may also correspond to the above-described grace period in which the operating system is given time to complete something, as long as it triggers the independent computation environment's measurement before the grace period expires. In this manner, the independent computation environment 302 may or may not operate, but no penalty will be assessed unless and until some violation is later detected.

When the independent computation environment does measure, in the "ICE Cares" time frame, the measurement needs to be started and correct at the time that is shown as "Performance Envelope" is reached, or some type enforcement will be activated. Again, the policy determines the timing, the type of measurement, the type of enforcement and so forth.

In general, when the validation fails, or some or all of the describing policy (e.g., comprising any data needed by the logic 344) is absent, the independent computation environment 302 penalizes the computer system by changing its state in some way, as generally described above. For example, when the code that is in memory is not the correct set of code and/or is not behaving correctly at the measuring time, the enforcement mechanism is activated, e.g., to halt the system. Other examples include locking the computer system, slowing down the computer system, limiting memory in some way, slowing I/O, affecting (e.g., killing) a relevant process via trap instructions, overwriting process code with NOPs and/or infinite loop instructions, and so forth. The independent computation environment may alert the overlaying operating system prior to taking any penalizing acts.

It should be noted that numerous combinations of timing, the types of measurement, the types of enforcement and so forth may vary between classes of computers, or even in the same computer system itself. For example, in the same computer, one code module being evaluated may have to physically reside in the same location in memory at all times, another module may be swapped in and out but have to be present at measuring time, yet another module may be swappable at any time but have to periodically meet performance requirements (meaning it has to be executed often enough to do so), and so forth.

The enforcement that is taken need not be the same if a violation is detected, and different types of violations may result in different types of enforcement. For example, changing one (e.g., highly critical) code module may result in the system being shut down by the ICE, whereas changing another may result in the operating system being notified so as to present a warning to the user or send a message to the computer system manufacturer, program vendor or the like (e.g., some licensing entity). As another example, as described above, missing a statistic may not result in an immediate penalty, but instead will result in more careful watching, at least for awhile, to determine if further enforcement should be taken.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computing system comprising:
    a processor;
    a memory;
    a software operating system;
    an independent computation environment contained at least in part in a set of one or more hardware components, wherein the independent computation environment comprises a trusted external processing environment that is physically separate and isolated from the software operating system, the memory, the processor and a storage device on which the operating system is stored, wherein the trusted external processing environment implements the trusted external processing environment to prevent tampering by users, tampering by the operating system and tampering by other software functions, wherein the trusted external processing environment comprises an external root of trust that is independent of the operating system and that is trusted to access software code on the storage device on which the operating system is stored and measure the health of various software code sets stored on the storage device, wherein the health measurement provides an indication of the current operating status of the software code set and wherein the health measurement includes evaluating one or more memory locations and placing a re-read trigger upon changes that occur during a reading operation which is part of the memory evaluation such that memory locations that were already read cannot be changed behind the memory location currently being read, the memory evaluation being executed on a redetermined, periodic basis according to a predefined policy; and
    hosted logic of the independent computation environment that measures the health of at least one set of software code that is in memory to cause an action if the set of software code is measured to be unhealthy according to policy data, wherein upon determining that the measured software code set is unhealthy, the software code set is operated in a reduced-performance mode that reduces the utility of the software code set.

2. The system of claim 1 wherein the independent computation environment is incorporated at least in part in a separate hardware component.

3. The system of claim 1 wherein the independent computation environment is incorporated at least in part in a hardware component that performs at least one other computing function.

4. The system of claim 3 wherein the independent computation environment is incorporated at least in part into a central processing unit.

5. The system of claim 1 further comprising a memory watch component that watches at least one location in the memory corresponding to the measured set of code and alerts the hosted logic of any change at a watched location.

6. The system of claim 5 wherein the memory watch component alerts the hosted logic of any change at a watched location including while the hosted logic is currently measuring the health of the at least one set of software code.

7. The system of claim 1 wherein the independent computation environment includes at least one interface for communication with an operating system.

8. The system of claim 1 further comprising a set of one or more registers that maintain information regarding the operation of at least one set of software code, the information being accessible to the hosted logic to evaluate against policy data.

9. In a computer system that includes at least a processor, a memory and a software operating system, a method comprising:
   executing logic in an independent computation environment that is incorporated in hardware coupled to the computer system, wherein the independent computation environment comprises a trusted external processing environment that is physically separate and isolated from the software operating system, the memory, the processor and a storage device on which the operating system is stored, wherein the trusted external processing environment implements the trusted external processing environment to prevent tampering by users, tampering by the operating system and tampering by other software functions, wherein the trusted external processing environment comprises an external root of trust that is independent of the operating system and that is trusted to access software code on the storage device on which the operating system is stored and measure the health of various software code sets stored on the storage device, wherein the health measurement provides an indication of the current operating status of the software code set and wherein the health measurement includes evaluating one or more memory locations and placing a re-read trigger upon changes that occur during a reading operation which is part of the memory evaluation such that memory locations that were already read cannot be changed behind the memory location currently being read, the memory evaluation being executed on a predetermined, periodic basis according to a predefined policy; and
   measuring, via the logic, the health of at least one software code set that is loaded into memory based on policy associated with the software code, wherein upon determining that the measured software code set is unhealthy, the software code set is operated in a reduced-performance mode that reduces the utility of the software code set.

10. The method of claim 9 wherein measuring the health comprises validating the integrity and/or authenticity of the software code.

11. The method of claim 9 wherein measuring the health comprises performing a mathematical computation on the software code in the memory to obtain a result and evaluating the result against a value in metadata associated with the policy.

12. The method of claim 9 wherein measuring the health comprises evaluating statistical information gathered during operation of the software code against metadata associated with the policy.

13. The method of claim 11 wherein evaluating the metadata comprises evaluating at least one of: a digital signature, a certificate, and/or statistics associated with the software code.

14. The method of claim 9 wherein measuring the health determines that the software code is not healthy, and further comprising, taking action that will result in penalizing the computer system's state.

15. The method of claim 9 wherein taking action includes at least one of halting the computer system, rebooting the computer system, locking the computer system, slowing down the computer system, limiting memory usage, slowing input/output operations, affecting a process via trap instructions, and affecting a process by overwriting process code.

16. The method of claim 9 wherein measuring the health determines that the software code is not healthy, and further comprising changing at least temporarily a technique for further measurement of the health of the software code.

17. At least one computer-readable storage device having stored thereon computer-executable instructions, which when executed perform steps, comprising:
   (a) executing logic in an independent computation environment that exists in hardware coupled to a computer system that includes at least a central processing unit, a memory and a software operating system, wherein the independent computation environment comprises a trusted external processing environment that is physically separate and isolated from the software operating system, the memory, the processor and a storage device on which the operating system is stored, wherein the trusted external processing environment implements the trusted external processing environment to prevent tampering by users, tampering by the operating system and tampering by other software functions, wherein the trusted external processing environment comprises an external root of trust that is independent of the operating system and that is trusted to access software code on the storage device on which the operating system is stored and measure the health of various software code sets stored on the storage device, wherein the health measurement provides an indication of the current operating status of the software code set and wherein the health measurement includes evaluating one or more memory locations and placing a re-read trigger upon changes that occur during a reading operation which is part of the memory evaluation such that memory locations that were already read cannot be changed behind the memory location currently being read, the memory evaluation being executed on a predetermined, periodic basis according to a predefined policy;
   (b) measuring via the logic whether a set of software code complies with policy data, and,
      (1) when the set of software code complies, returning to step (a) according to other policy data, and
      (2) when the set of software code does not comply, taking action that will result in the software code being operated in a reduced-performance mode that reduces the utility of the software code set.

18. The computer-readable medium of claim 17 wherein the set of software code complies, and wherein the other policy data causes a return to step (a) after a delay.

19. The computer-readable medium of claim 18 wherein the logic communicates information to the operating system informing the operating system that memory corresponding to the code may be repurposed during the delay.

20. The computer-readable medium of claim 17 wherein measuring whether the set of software code complies with the policy data comprises evaluating statistical information gathered during operation of the software code against the policy data.

21. The computer-readable medium of claim 20 wherein evaluating the statistical information comprises performing at least one action of a set of possible actions, the set containing: determining how an instruction pointer gets into and out of specified a memory range of interest, determining how often the software code is in memory, determining how often at least one instruction of the software code is executed, determining an expected value of a register at a certain instruction, and determining a relationship between the expected values of a plurality of registers and memory addresses.

22. The computer-readable medium of claim 17 wherein measuring whether the set of software code complies with the policy data comprises performing a mathematical computation on the software code in the memory to obtain a result.

23. The system of claim 1, wherein the independent computation environment is comprised in hardware that is physically separate from the system's processor.

* * * * *

UNITED STATES PATENT AND TRADEMARK OFFICE
CERTIFICATE OF CORRECTION

| | | |
|---|---|---|
| PATENT NO. | : 8,112,798 B2 | Page 1 of 1 |
| APPLICATION NO. | : 11/418710 | |
| DATED | : February 7, 2012 | |
| INVENTOR(S) | : Alexander Frank et al. | |

It is certified that error appears in the above-identified patent and that said Letters Patent is hereby corrected as shown below:

In column 12, line 45-46, in Claim 1, delete "redetermined" and insert -- predetermined --, therefor.

Signed and Sealed this
Twenty-seventh Day of March, 2012

David J. Kappos
*Director of the United States Patent and Trademark Office*